United States Patent
Bansal et al.

(10) Patent No.: US 8,782,812 B2
(45) Date of Patent: Jul. 22, 2014

(54) WATERPROOF BREATHABLE GARMENT WITH TAPE-FREE SEAMS

(75) Inventors: Vishal Bansal, Overland Park, KS (US); James P. Lenox, Kansas City, MO (US)

(73) Assignee: BHA Altair, LLC, Franklin, TN (US)

( * ) Notice: Subject to any disclaimer, the term of this patent is extended or adjusted under 35 U.S.C. 154(b) by 1209 days.

(21) Appl. No.: 11/438,956

(22) Filed: May 23, 2006

(65) Prior Publication Data
US 2007/0271669 A1 Nov. 29, 2007

(51) Int. Cl.
*A41D 13/02* (2006.01)

(52) U.S. Cl.
USPC ............................ 2/69; 428/57

(58) Field of Classification Search
USPC ........ 428/198, 101, 129, 57–62; 2/84, 88, 87, 2/93, 108, 275, 2.15, 69; 112/419; 156/88, 304.3, 223, 272.2, 275.1, 156/275.3, 275.7, 304.1; 442/149–151, 442/263–266
See application file for complete search history.

(56) References Cited

U.S. PATENT DOCUMENTS

| | | | | |
|---|---|---|---|---|
| 1,935,612 A | * | 11/1933 | Brady | 383/108 |
| 2,115,368 A | * | 4/1938 | Lustberg | 428/57 |
| 2,465,374 A | * | 3/1949 | Haman et al. | 428/104 |
| 2,992,957 A | * | 7/1961 | Maxey | 428/494 |
| 3,026,225 A | * | 3/1962 | Ostby, Jr. | 428/57 |
| 3,255,068 A | * | 6/1966 | Fairbairn Smith | 442/104 |
| 3,824,992 A | | 7/1974 | Nicholson et al. | |
| 3,849,803 A | | 11/1974 | Connors | |
| 4,109,042 A | * | 8/1978 | Estes et al. | 428/193 |
| 4,190,010 A | | 2/1980 | Bibby | |
| 4,444,192 A | | 4/1984 | Stern et al. | |
| 4,604,152 A | * | 8/1986 | Liukko | 156/93 |
| 4,613,534 A | * | 9/1986 | Blizzard et al. | 428/57 |
| 4,670,073 A | * | 6/1987 | Langley | 156/73.1 |
| 4,733,546 A | * | 3/1988 | Toda | 66/202 |
| 4,747,846 A | | 5/1988 | Boland et al. | |
| 4,895,569 A | | 1/1990 | Wilson et al. | |
| 5,003,902 A | * | 4/1991 | Benstock et al. | 112/418 |
| 5,072,455 A | | 12/1991 | St. Ours | |
| RE33,966 E | | 6/1992 | Robison | |
| 5,159,719 A | | 11/1992 | Aumann | |
| 5,162,149 A | | 11/1992 | Reaney | |
| 5,185,011 A | | 2/1993 | Strasser | |
| 5,236,430 A | | 8/1993 | Bridges | |
| 5,244,716 A | * | 9/1993 | Thornton et al. | 428/198 |

(Continued)

FOREIGN PATENT DOCUMENTS

| | | |
|---|---|---|
| DE | 10202715 A1 | 12/2002 |
| WO | WO2004/091902 A1 | 10/2004 |

OTHER PUBLICATIONS

Chinese Patent Office, State Intellectual Property Office, P.R. China, First Office Action and Text of First Office Action for Application No. 200710104242.5, May 13, 2010, 6 pages, CN.

(Continued)

*Primary Examiner* — Richale Quinn
(74) *Attorney, Agent, or Firm* — Reinhart Boerner Van Deuren P.C.

(57) ABSTRACT

A waterproof breathable garment is provided. The waterproof garment includes a first segment of a laminated composite material, a second segment of the laminated composite material, and a seam joining the first and the second segments of the laminated composite material to form the garment. The seam includes a light curable adhesive.

20 Claims, 3 Drawing Sheets

(56) References Cited

U.S. PATENT DOCUMENTS

| | | | | |
|---|---|---|---|---|
| 5,264,276 A | * | 11/1993 | McGregor et al. | 442/289 |
| 5,364,678 A | * | 11/1994 | Lumb et al. | 428/96 |
| 5,498,472 A | | 3/1996 | Gold | |
| 5,516,813 A | * | 5/1996 | Starkey | 522/25 |
| 5,526,532 A | * | 6/1996 | Willard | 2/69 |
| 5,532,037 A | | 7/1996 | Aumann | |
| 5,568,779 A | * | 10/1996 | Wong | 112/441 |
| 5,590,615 A | * | 1/1997 | Wong | 112/441 |
| 5,593,754 A | | 1/1997 | Blauer et al. | |
| 5,670,577 A | * | 9/1997 | Dawson, Jr. | 525/95 |
| 5,685,874 A | | 11/1997 | Buell et al. | |
| 5,731,059 A | * | 3/1998 | Smith et al. | 428/192 |
| 5,782,191 A | * | 7/1998 | Wong | 112/441 |
| 5,836,932 A | | 11/1998 | Buell et al. | |
| 5,884,332 A | | 3/1999 | Snedeker | |
| 5,885,679 A | * | 3/1999 | Yasue et al. | 428/57 |
| 5,896,582 A | | 4/1999 | Baacke et al. | |
| 5,931,827 A | | 8/1999 | Buell et al. | |
| 6,052,826 A | | 4/2000 | Tolton | |
| 6,174,932 B1 | * | 1/2001 | Pachl et al. | 522/100 |
| 6,228,477 B1 | * | 5/2001 | Klare et al. | 428/315.5 |
| 6,286,145 B1 | * | 9/2001 | Welchel et al. | 2/69 |
| 6,336,221 B1 | * | 1/2002 | Blauer et al. | 2/87 |
| 6,342,280 B1 | * | 1/2002 | Patrick et al. | 428/34.6 |
| 6,415,449 B2 | * | 7/2002 | Duplock | 2/275 |
| 6,416,613 B1 | * | 7/2002 | Patrick et al. | 156/281 |
| 6,497,934 B1 | * | 12/2002 | Mahn et al. | 428/57 |
| 6,502,248 B2 | * | 1/2003 | LeGette et al. | 2/209 |
| 6,579,403 B2 | * | 6/2003 | Tolbert et al. | 156/291 |
| 6,649,251 B1 | | 11/2003 | Druecke et al. | |
| 6,680,100 B1 | * | 1/2004 | Kocinec et al. | 428/102 |
| 6,694,528 B1 | * | 2/2004 | Chang | 2/275 |
| 6,716,778 B1 | * | 4/2004 | Hottner | 442/199 |
| 6,797,352 B2 | * | 9/2004 | Fowler | 428/57 |
| 6,817,037 B1 | * | 11/2004 | King | 2/275 |
| 7,005,021 B2 | * | 2/2006 | Kramer | 156/73.4 |
| 7,148,160 B2 | * | 12/2006 | Porter | 442/36 |
| 7,191,720 B2 | * | 3/2007 | Thomas | 112/475.09 |
| 7,228,809 B2 | * | 6/2007 | Angelino et al. | 112/475.08 |
| 7,258,762 B2 | * | 8/2007 | Fowler | 156/308.2 |
| 7,310,824 B2 | * | 12/2007 | Walsh | 2/122 |
| 7,318,239 B2 | * | 1/2008 | Wood et al. | 2/69 |
| 7,854,022 B2 | * | 12/2010 | Warren et al. | 2/401 |
| 2001/0001300 A1 | * | 5/2001 | Tolbert et al. | 442/60 |
| 2001/0008027 A1 | * | 7/2001 | Duplock | 2/69 |
| 2002/0197924 A1 | * | 12/2002 | Halley et al. | 442/148 |
| 2003/0044563 A1 | * | 3/2003 | Kocinec et al. | 428/63 |
| 2003/0126673 A1 | | 7/2003 | Yardley | |
| 2003/0138586 A1 | * | 7/2003 | Fowler | 428/57 |
| 2004/0025221 A1 | * | 2/2004 | Clark | 2/159 |
| 2004/0063800 A1 | * | 4/2004 | Brantl et al. | 521/82 |
| 2004/0151864 A1 | * | 8/2004 | Thomas | 428/58 |
| 2004/0214489 A1 | * | 10/2004 | Porter | 442/36 |
| 2005/0022920 A1 | * | 2/2005 | Fowler | 156/88 |
| 2005/0081281 A1 | * | 4/2005 | Hannon et al. | 2/275 |
| 2005/0208554 A1 | | 9/2005 | Sadato et al. | |
| 2005/0230026 A1 | * | 10/2005 | Kramer | 156/73.4 |
| 2007/0003728 A1 | * | 1/2007 | Hannon et al. | 428/57 |
| 2007/0026186 A1 | * | 2/2007 | Chapuis | 428/57 |
| 2007/0082165 A1 | * | 4/2007 | Barrett | 428/57 |
| 2007/0181241 A1 | * | 8/2007 | Kramer et al. | 156/73.4 |
| 2007/0184742 A1 | * | 8/2007 | Coulson et al. | 442/370 |
| 2007/0289047 A1 | * | 12/2007 | Fortner | 2/268 |
| 2008/0044614 A1 | * | 2/2008 | Hannon | 428/57 |
| 2008/0044777 A1 | * | 2/2008 | Gary et al. | 430/325 |

OTHER PUBLICATIONS

Canadian Office Action dated Aug. 26, 2013 from corresponding CA Application No. 2,588,222.

* cited by examiner

WATERPROOF BREATHABLE GARMENT WITH TAPE-FREE SEAMS

BACKGROUND OF THE INVENTION

This invention relates generally to waterproof garments, and more particularly, to waterproof garments that have tape-free seams.

Some known garments are stitch-free. Such garments are made by ultrasonic or heat welding of fabrics together. However, these types of welds do not impart sufficient structural integrity or make the garment waterproof. A seam tape is typically used to make these types of welds waterproof and strong. Also, some known garments include seams that are held together by stitching. However, because of the openings that are created in the stitching process, seam tapes are used in the manufacture of waterproof garments.

The use of seam tapes adds bulk and can make the edges of the seams visible from outside the garment. Also, the equipment needed for applying the seam tapes are specialized and require development time and costs. In addition, the use of seam tapes further increases the overall cost of the garment because the garment factory needs to inventory one seam tape for every version of tricot that the factory processes.

BRIEF DESCRIPTION OF THE INVENTION

In one aspect, a waterproof breathable garment is provided. The garment includes a first segment of a laminated composite material, a second segment of the laminated composite material, and a seam joining the first and the second segments of the laminated composite material to form the garment. The seam includes a light curable adhesive.

In another aspect, a method of making a waterproof breathable garment is provided. The method includes the steps of providing a composite material including a first segment and a second segment, and forming a seam joining the first and second segments of the composite material. The seam includes a light curable adhesive.

DETAILED DESCRIPTION OF THE INVENTION

Waterproof breathable garments with tape free seams are described below in detail. In an exemplary embodiment, the seams of the waterproof garments include a visible light curable adhesive. In one embodiment, the light curable adhesive is used to form an overlap seam that does not incorporate stitching or seam tape. In another embodiment, the adhesive is used after stitching the seam together to waterproof the seam and provide added strength. Eliminating seam tapes produces seams that are not visible from outside the garment and provides for a lighter weight and more comfortable garment. Also, eliminating seam tapes eliminates the need for seam sealing equipment which reduces the time and cost of manufacturing the waterproof garments.

Figure 1:
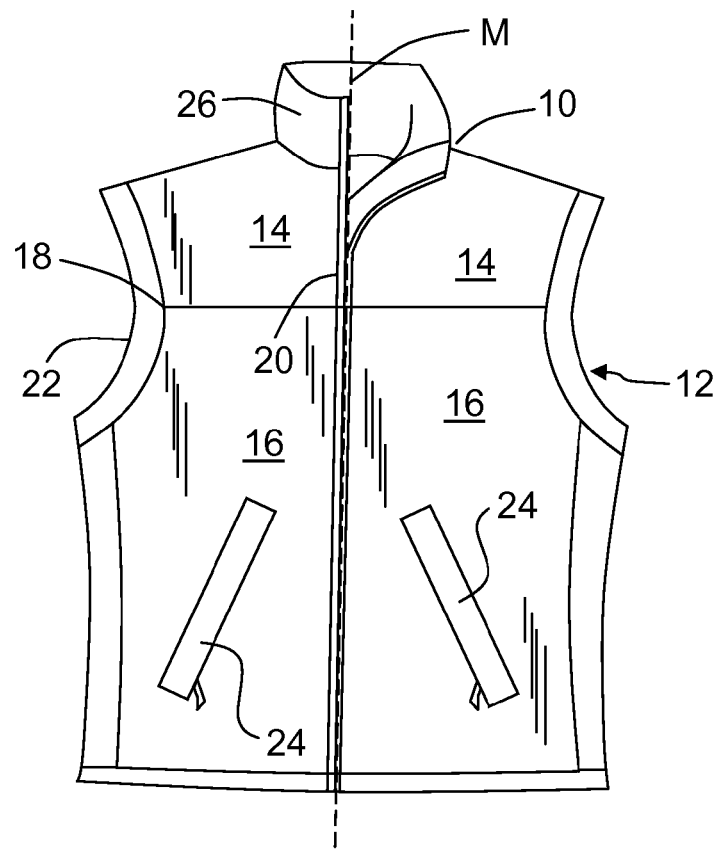
FIG. 1 is a front schematic illustration of a garment.

Referring to the drawings, FIG. 1 illustrates a front view of a garment 10. The illustrated embodiment is not intended to limit the scope of the present invention because other uses are also contemplated. Garment 10 is constructed to inhibit relatively moving air from contacting at least a portion of a person wearing the garment (vest) while being moisture vapor transmissive and water-resistant. Garment 10 includes a wind proof front panel 12 adapted to cover at least a portion of the front upper torso of a person wearing garment 10. Garment 10 is divided into a pair of equal sized sides by a mid-plane M of the vest. Each side of front panel 12 of vest 10 includes an upper front panel portion 14 and a lower front panel portion 16. Upper front panel portion 14 on each side of the garment 10 is attached to lower front panel portion 16 by a seam 18.

Front panel 12 of vest 10 includes a full-length zipper 20. Garment 10 may optionally include a wind flap (not shown) adjacent zipper 20. Garment 10 has a pair of armholes 22. Each armhole 22 may receive an arm of the wearer. Garment 10 also includes a pair of pockets 24. Each pocket 24 is located on a respective side of front panel 12 of garment 10 and includes a wind flap. Garment 10 includes a collar 26 to extend around the neck of the person wearing garment 10. Further details regarding garment 10 are set forth in U.S. Pat. No. 6,018,819, which is assigned to the present assignee.

Figure 2:
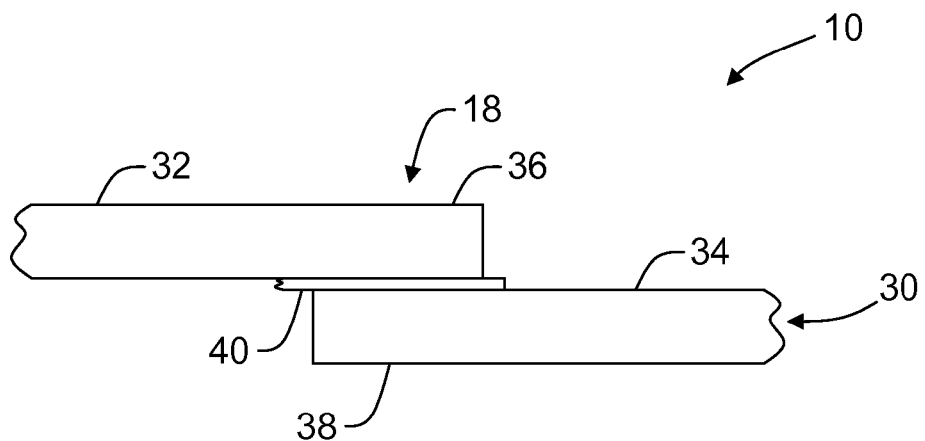
FIG. 2 is a sectional illustration of the garment shown in FIG. 1 with a tape-free seam, stitch-free in accordance with an embodiment of the present invention.

FIG. 2 is a sectional illustration of garment 10 that includes, in an exemplary embodiment, at least one tape-free seam 18. Garment 10 is formed from a multilayered fabric laminate 30. Garment 10 includes a first segment 32 and a second segment 34. Seam 18 is formed by the overlap of a portion 36 of first segment 32 and a portion 38 of second segment 34. A light curable adhesive 40 is positioned between portions 36 and 38 of first and second segments 32 and 34 respectively. Adhesive 40 forms a waterproof barrier at seam 18 upon curing.

Figure 3:
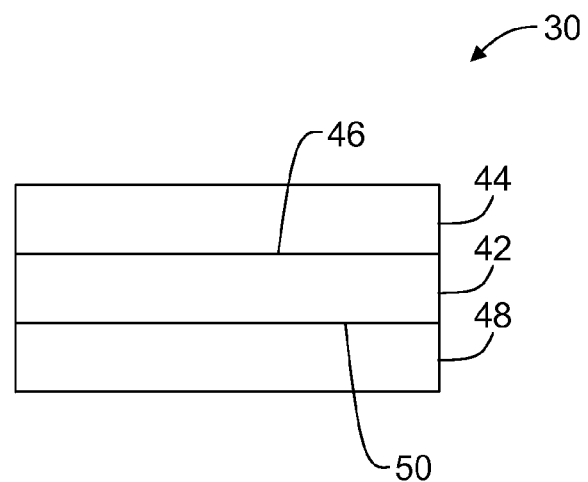
FIG. 3 is a sectional illustration of the composite material of the garment shown in FIG. 1.
Figure 5:
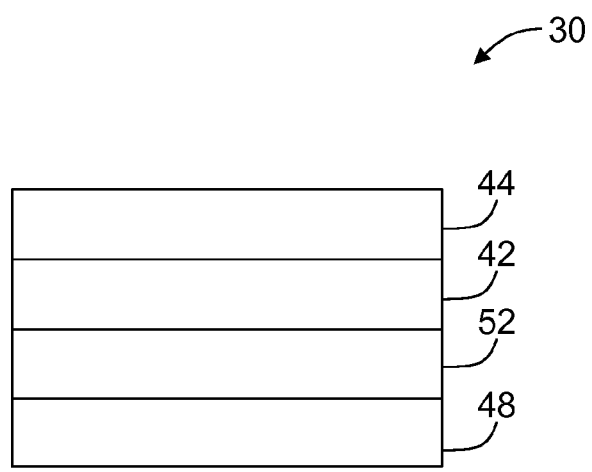
FIG. 5 is a sectional illustration of an embodiment of the composite material of the garment shown in FIG. 1.

Referring also to FIG. 3, multilayered fabric laminate 30 includes an open pore membrane layer 42 and a first fabric layer 44 laminated to a first side 46 membrane layer 42. Optionally, a second fabric layer 48 is laminated to a second side 50 of membrane layer 42. In alternate embodiments, laminate 30 includes multiple layers laminated between first and second fabric layers 44 and 48. For example, in one embodiment as illustrated in FIG. 5, laminate 30 includes an open pore membrane layer 42 formed from, for example, expanded polytetrafluoroethylene (ePTFE), and a layer 52 of activated carbon laminated between first and second fabric layers 44 and 48. In another exemplary embodiment, laminate 30 includes an open pore membrane layer 42 formed from, for example, ePTFE, and an open pore membrane layer formed from, for example, polyurethane laminated between first and second fabric layers 44 and 48.

In the exemplary embodiment, membrane layer 42 is made from polytetrafluoroethylene (PTFE) film that has been expanded to form an open pore structured membrane known as expanded polytetrafluoroethylene (ePTFE). In alternate embodiments, woven polytetrafluoroethylene and non-woven polytetrafluoroethylene are used to make membrane layer 42. Other materials can be used to form a suitable membrane layer 42 that provides a waterproof and breathable structure. For example, other suitable materials include, but are not limited to, polyolefin, polyamide, polyester, polysulfone, polyether, acrylic and methacrylic polymers, polystyrene, polyurethane, polypropylene, polyethylene, and $CaCO_3$ filled polyethylene.

In the exemplary embodiment, membrane layer 42 includes a treatment or coating on surfaces of membrane layer

42, for example, a fluorinated polymer material, that enhances the oleophobic properties without compromising the gas permeability of membrane layer 42. Suitable examples of fluorinated polymer include, but are not limited to, fluorinated urethane polymers, perfluoro alkyl acrylic (methacrylic) copolymers, random copolymers composed of fluorinated acrylate(methacylate), butyl acrylate or a comparable n-alkyl acrylate(methacrylate). Fluorinated polymers are available from DuPont under the trade name Zonyl®.

Fabric layers 44 and 48 can be made from the same material or from different materials. In the exemplary embodiment, fabric layer 44 and/or fabric layer 48 are formed from a woven, nonwoven, or knitted textile constructed from fibers formed from at least one of polyamid, polyester, polyolefins, thermoplastic polyurethanes, elastomer (for example, HYTREL®), polyetherimide, liquid crystal polymers, polyphenyl ether, polyphenylene sulfide, cotton, and aramids. Fabric layers 44 and/or 48, in one embodiment, have moisture wicking and anti-microbial properties for enhanced user comfort. In another embodiment, fabric layers 44 and/or 48 are treated with a durable water repellent material. In alternate embodiments, fabric layers 44 and/or 48 are formed from multiple layers of textile.

Light curable adhesive 40 is acrylate based or urethane based. A visible light source, for example a high intensity visible light source is used to cure adhesive 40. A suitable visible light source emits visible light having, in one embodiment, a wavelength of about 390 nm to about 410 nm, and in another embodiment a wavelength of about 400 nm to about 410 nm. Light curable adhesives and visible light sources a known and commercially available from, for example, Henkle Loctite Corporation, Rocky Hill, Conn. The visible light waves cures adhesive 40 by facilitating crosslinking of the acrylate or urethane resins in adhesive 40. Areas of deposited adhesive 40 that are not in the line of sight of the high intensity visible light waves also cure because of an elevated temperature of adhesive 40 caused by the excitation of the portion of adhesive 40 exposed to the high intensity light.

Figure 4:
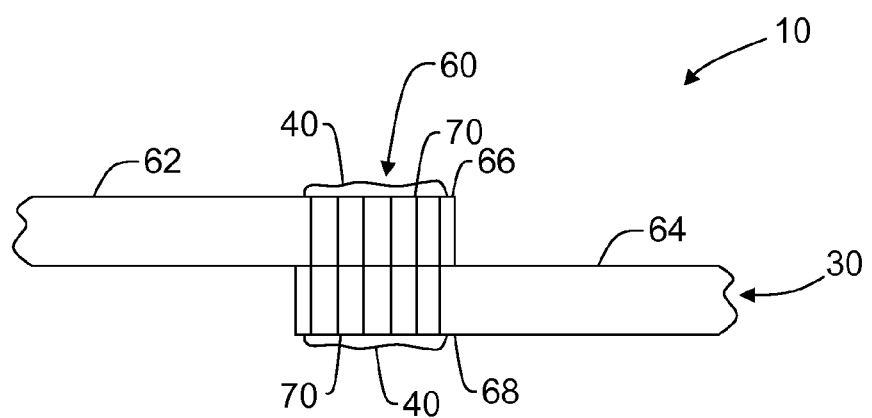
FIG. 4 is a sectional illustration of the garment shown in FIG. 1 with a tape-free seam in accordance with another embodiment of the present invention.

FIG. 4 is a sectional illustration of garment 10 in accordance with another exemplary embodiment. Garment 10 is formed from multilayered fabric laminate 30 and includes at least one tape-free seam 60. Garment 10 includes a first segment 62 and a second segment 64. Seam 60 is formed by stitching a portion 66 of first segment 62 and a portion 68 of second segment 64 together. Light curable adhesive 40 is positioned over a plurality of openings 70 formed in portions 66 and 68 of first and second segments 62 and 64 by stitching 72. Light curable adhesive 40 seals openings 70 upon curing with visible light making the seam waterproof. In another embodiment, light curable adhesive 40 is only applied to openings 70 formed in portion 66. In another embodiment, light curable adhesive 40 is only applied to openings 70 formed in portion 68.

The invention will be further described by reference to the following examples which are presented for the purpose of illustration only and are not intended to limit the scope of the invention.

EXAMPLE 1

A three layer fabric laminate, used make waterproof breathable garments was used in this example. The laminate (eVI38-3L) is commercially available from BHA Group, Inc., Kansas City, Mo. The three layers in the eVI38-3L laminate are a woven polyamide face fabric, an olephobically treated microporous ePTFE membrane, and a Nylon knit backing fabric. Two sample pieces of this material were cut from the fabric laminate using a mechanical sample clicker. Each piece was approximately 8 inches×10 inches in dimensions. A seam was formed by were overlapping by approximately 10 mm the two long edges of these samples and joining them together by applying a thin uniform coating of light curable adhesive, Loctite® 3105, commercially available from Henkel Corporation, Rocky Hill, Conn., between the overlapped edges. The adhesive was cured using a hand-held high intensity visible light source, Loctite® 7700 hand-held LED light source, commercially available from Henkel Corporation, Rocky Hill, Conn. The light source was kept approximately 1 cm from the fabric and traversed at speed of approximately 5 cm/sec.

The sample seam was found to be soft, flexible, and durable. Durability was verified by laundering the sample in a home laundering equipment for five cycles (no detergent) at temperature of 40° C. The sample seam was then tested for tensile strength per test method ASTM D-2262. The testing direction was perpendicular to the overlap direction of fabrics. In five different repeats of tensile testing, it was found that the fabric laminate failed prior to a failing of the seam joint.

The overlapped seam was also tested for waterproofness by checking for leaks when a water column pressure of 3 psig was applied for a period of 2 minutes. This is a commonly used test method in industry to verify the waterproofness of seams in a waterproof garment. The test seam passed this test before and after laundering.

EXAMPLE 2

A three layer fabric laminate, used make waterproof breathable garments was used in this example. The laminate (eVI38-3L) is commercially available from BHA Group, Inc., Kansas City, Mo. The three layers in the eVI38-3L laminate are a woven polyamide face fabric, an olephobically treated microporous ePTFE membrane, and a Nylon knit backing fabric. Two sample pieces of this material were cut from the fabric laminate using a mechanical sample clicker. Each piece was approximately 8 inches×10 inches in dimensions.

A seam was formed by stitching the two long edges of these test samples to form a butt seam. The plurality of openings formed by stitching were then filled by applying a thin uniform coating of light curable adhesive, Loctite® 3105, commercially available from Henkel Corporation, Rocky Hill, Connecticut. The adhesive was cured using a hand-held high intensity visible light source, Loctite® 7700 handheld LED light source, commercially available from Henkel Corporation, Rocky Hill, Connecticut. The light source was kept approximately 1 cm from the fabric and traversed at speed of approximately 5 cm/sec.

The seam was found to be soft, flexible, and durable. Durability was verified by laundering the test seam in home laundering equipment for five cycles (no detergent) at temperature of 40° C. The seam was tested for waterproofness by checking for leaks when a water column pressure of 3 psig was applied for a period of 2 minutes. The seam passed this test before and after the laundering.

The above examples show that by the use of light curable adhesives it is possible to eliminate the need for a heat-sealable seam tape in the garment manufacturing process. This results in a softer and lighter weight garment. In addition, the resultant products are lighter in weight and softer due to the eliminated weight and stiffness of a seam tape.

While the invention has been described in terms of various specific embodiments, those skilled in the art will recognize that the invention can be practiced with modification within the spirit and scope of the claims.

What is claimed is:

1. A waterproof breathable garment comprising:
    a first segment of a laminated composite material;
    a second segment of said laminated composite material, wherein said laminated composite material comprises a first fabric layer, a second fabric layer, at least one membrane layer laminated between said first and second fabric layers, and at least one carbon layer laminated between said first and second fabric layers; and
    a seam joining said first and said second segments of said laminated composite material to form said garment, said seam comprising a light curable, water proof, adhesive, wherein said seam does not include a seam tape.

2. A waterproof breathable garment in accordance with claim 1 wherein said seam comprises an overlap seam, said overlap seam comprising a portion of said first segment overlapping a portion of said second segment, and said light curable adhesive positioned between said overlapping portions of said first and second segments.

3. A waterproof breathable garment in accordance with claim 1 wherein a portion of said first segment is joined to a portion of said second segment by stitching forming said seam, said seam comprising said light curable adhesive positioned over a plurality of openings in said first and second segments formed by said stitching.

4. A waterproof breathable garment in accordance with claim 3 wherein said seam comprises a butt seam or an overlap seam.

5. A waterproof breathable garment in accordance with claim 1 wherein said light curable adhesive is an acrylate based adhesive or a urethane based adhesive.

6. A waterproof breathable garment in accordance with claim 5 wherein said light curable adhesive comprises a liquid or a film before curing.

7. A waterproof breathable garment in accordance with claim 1 wherein said light curable adhesive is curable from exposure to a visible light source emitting visible light having a wavelength of about 390 nm to about 410 nm.

8. A waterproof breathable garment in accordance with claim 1, wherein said membrane layer comprises a porous membrane layer having oleophobic properties.

9. A waterproof breathable garment in accordance with claim 8 wherein said porous membrane layer comprising at least one of expanded polytetrafluoroehtylene, woven polytetrafluoroehtylene, and non-woven polytetrafluoroehtylene.

10. A method of making a waterproof breathable garment, said method comprising:
    providing a composite material comprising a first segment and a second segment, wherein the composite material comprises a first fabric layer, a second fabric layer, at least one membrane layer laminated between said first and second fabric layers, and at least one carbon layer laminated between the first and second fabric layers; and
    forming a seam joining the first and second segments of the composite material, the seam comprising a light curable, waterproof adhesive, wherein forming a seam does not include using a seam tape.

11. A method in accordance with claim 10 wherein forming a seam comprises:
    applying the light curable adhesive to a portion of the first segment;
    positioning a portion of the second segment so as to overlap the portion of the first segment so that the light curable adhesive is located between the portion of the first section and the overlapping portion of the second portion;
    directing an output of a high intensity visible light source at the seam to cure the light curable adhesive.

12. A method in accordance with claim 10 wherein forming a seam comprises:
    stitching a portion of the first segment to a portion of second segment;
    applying the light curable adhesive to the portion of the first segment to cover any openings formed by the stitching;
    directing an output of a high intensity visible light source at the seam to cure the light curable adhesive.

13. A method in accordance with claim 11 wherein forming a seam further comprises applying the light curable adhesive to the portion of the second segment to cover any openings formed by the stitching.

14. A method in accordance with claim 10 wherein the seam comprises a butt seam or an overlap seam.

15. A method in accordance with claim 10 wherein the light curable adhesive is an acrylate based adhesive or a urethane based adhesive.

16. A method in accordance with claim 15 wherein the light curable adhesive comprises a liquid or a film before curing.

17. A method in accordance with claim 11 wherein directing an output of a high intensity visible light source at the seam to cure the light curable adhesive comprises directing a visible light having a wavelength of about 390 nm to about 410 nm at the seam to cure the light curable adhesive.

18. A method in accordance with claim 10, wherein the membrane layer includes a porous membrane layer having oleophobic properties.

19. A method in accordance with claim 18 wherein the porous membrane layer comprises at least one of expanded polytetrafluoroehtylene, woven polytetrafluoroehtylene, and non-woven polytetrafluoroehtylene.

20. A seam formed between two pieces of a multilayered textile material comprising a first fabric layer, a second fabric layer, at least one membrane layer laminated between the first and second fabric layers and at least one carbon layer laminated between the first and second fabric layers, said seam comprising a light curable adhesive, wherein the adhesive is not a seam tape.

* * * * *